United States Patent [19]
Christiansen

[11] 4,344,915
[45] Aug. 17, 1982

[54] NUCLEAR REACTOR FUEL ROD ATTACHMENT SYSTEM

[75] Inventor: David W. Christiansen, Kennewick, Wash.

[73] Assignee: The United States of America as represented by the United States Department of Energy, Washington, D.C.

[21] Appl. No.: 187,913

[22] Filed: Sep. 17, 1980

[51] Int. Cl.³ ............................................. G21C 3/32
[52] U.S. Cl. .................................... 376/437; 376/434
[58] Field of Search ................................. 376/437, 434

[56] References Cited

U.S. PATENT DOCUMENTS

| | | | |
|---|---|---|---|
| 3,109,802 | 11/1963 | Blake | 376/437 |
| 3,137,635 | 6/1964 | Moore | 376/437 |
| 3,150,057 | 9/1964 | Monson | 376/437 |
| 3,743,578 | 7/1973 | Agranier | 376/437 |
| 3,755,077 | 8/1973 | Agranier | 376/437 |
| 3,890,197 | 6/1975 | Butts | 376/437 |
| 3,945,885 | 3/1976 | Cocker | 376/437 |
| 3,951,739 | 4/1976 | Frick | 376/437 |
| 3,996,101 | 12/1976 | Marmonier | 376/437 |
| 4,003,787 | 1/1977 | Marmonier | 376/437 |

FOREIGN PATENT DOCUMENTS 2018009  10/1979  United Kingdom ................. 376/437

Primary Examiner—Donald P. Walsh
Attorney, Agent, or Firm—Douglas E. Erickson; Richard E. Constant; Richard G. Besha

[57] ABSTRACT

A reusable system for removably attaching a nuclear reactor fuel rod (12) to a support member (14). A locking cap (22) is secured to the fuel rod (12) and a locking strip (24) is fastened to the support member (14). The locking cap (22) has two opposing fingers (24a and 24b) shaped to form a socket having a body portion (26). The locking strip has an extension (36) shaped to rigidly attach to the socket's body portion (26). The locking cap's fingers are resiliently deflectable. For attachment, the locking cap (22) is longitudinally pushed onto the locking strip (24) causing the extension (36) to temporarily deflect open the fingers (24a and 24b) to engage the socket's body portion (26). For removal, the process is reversed.

11 Claims, 5 Drawing Figures

NUCLEAR REACTOR FUEL ROD ATTACHMENT SYSTEM

The United States Government has rights in this invention pursuant to Contract No. EY-76-C-14-2170 between the U.S. Department of Energy and the Westinghouse Hanford Company.

BACKGROUND OF THE INVENTION

The present invention relates generally to nuclear reactor fuel rod attachment devices and more particularly to a reusable system for removably attaching a nuclear fuel rod to a support member.

The core of a typical nuclear reactor includes many fuel assemblies, with each fuel assembly having many closely-spaced, elongated, cladded fuel rods (also called fuel pins), and with each fuel rod generally containing many fuel pellets. Coolant usually flows in through the bottom of the fuel assembly, up through the spaces between the fuel rods and out through the top of the fuel assembly.

The fuel assembly usually contains a support member, and means must be supplied to attach one end of the fuel rod (usually the bottom end) to this support member. Firm attachment is necessary as the fuel rods can be subjected to any number of disturbances, such as: irradiation-induced swelling, fluid flow, thermal variations, and the like. At the same time, the need arises to remove the fuel rods for various reasons, such as: inspection, testing, maintenance and/or replacement.

U.S. Pat. Nos. 3,150,057; 3,743,578; 3,755,077; 3,890,197; 3,951,739; 3,996,101; and 4,003,787 disclose fuel rod attaching mechanisms which engage strips having circular, widened portions. In these patents, fuel rods are slid sideways onto the strips and secured for in-reactor operation. Total, or at least considerable, fuel assembly dismantling must take place prior to removing even one fuel rod.

In U.S. Pat. No. 3,945,885 (Cocker et al, Mar. 23, 1976), attachment is accomplished by a spigot/socket arrangement. The socket has a lead-in taper and may also have a lead-out taper. The spigot has a lead-in taper but does not have a lead-out taper. Attachment is by a push fit in which the two lead-in tapers allow the socket to expand to accept the spigot into the socket cavity. Removal is accomplished by pulling apart with sufficient force to distort the spigot and/or socket. There may even be fracturing of these parts. This distortion of materials is a desired goal of that patent. The onetime removability does not allow that attachment/removal system to be reused. The spigot is also purposely designed not to fill the entire socket cavity so that there is no rigid attachment, and limited lateral and longitudinal movement under such forces as coolant flow and gravity is allowed.

SUMMARY OF THE INVENTION

It is an object of the invention to quickly, inexpensively and rigidly attach a nuclear reactor fuel rod to a support member.

It is another object of the invention to quickly, inexpensively and nondestructively remove an attached nuclear reactor fuel rod from a support member.

It is a further object of the invention to allow repeated attachment and removal of a nuclear reactor fuel rod and a support member.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the nuclear reactor fuel rod and support member attachment and removal system may comprise a locking cap fastened to the nuclear reactor fuel rod and a locking strip fastened to the support member. Both the locking cap and the locking strip can be used repeatedly. The locking cap has two or more opposing fingers shaped to form a socket having a body portion with a narrowing lead-out chamfered section from the body portion to a throat portion and a narrowing lead-in chamfered section from a mouth portion to the throat portion. The fingers spring back when moved apart and released. The locking strip has an extension shaped to rigidly attach to the socket's body portion. The top part of the extension is capable of being pushed against the socket's lead-in chamfered section to move the fingers apart to widen the socket's throat portion to allow attachment. The bottom portion of the extension is capable of being pulled against the socket's lead-out chamfered section to move the fingers apart to widen the socket's throat to allow removal.

In a further aspect of the present invention, in accordance with its objects and purposes, the system hereof may also comprise the above-mentioned locking cap fastened to the support member with the above-mentioned locking strip fastened to the nuclear reactor fuel rod.

In another aspect of the present invention, the system hereof may also comprise a locking cap whose chamfered sections would flatten a resiliently transversely compressible locking strip extension to allow the extension to squeeze through the socket's throat portion for attachment and removal.

In an additional aspect of the invention, the above-mentioned compressible locking strip is fastened to the nuclear reactor fuel rod and the locking cap is fastened to the support member.

Several benefits and advantages are derived from the invention. The invention's rapid attachment and removal feature allows easy removal of a fuel rod from within the fuel assembly for inspection, testing, maintenance and the like. The invention's reusability feature allows the removed fuel rod to be reinserted or replaced with a different fuel rod. This is to be contrasted with that prior art patent which provided for a destructive, one-time removal system. The invention's reusability feature and rapid attachment and removal feature provide an economic benefit for test and/or commercial reactors. Use of the invention in the U.S. Department of Energy's Fast Flux Test Facility reactor in Richland, Wash., would be expected to save over $1,000,000 a year.

BRIEF DESCRIPTION OF THE DRAWINGS

The accompanying drawings, which are incorporated in and form a part of this specification, illustrate an embodiment of the present invention and, together with the description, serve to explain the principles of the invention. In the drawings.

DETAILED DESCRIPTION OF THE INVENTION

Reference will now be made in detail to the present preferred embodiment of the invention, an example of which is illustrated in the accompanying drawings.

Figure 1:
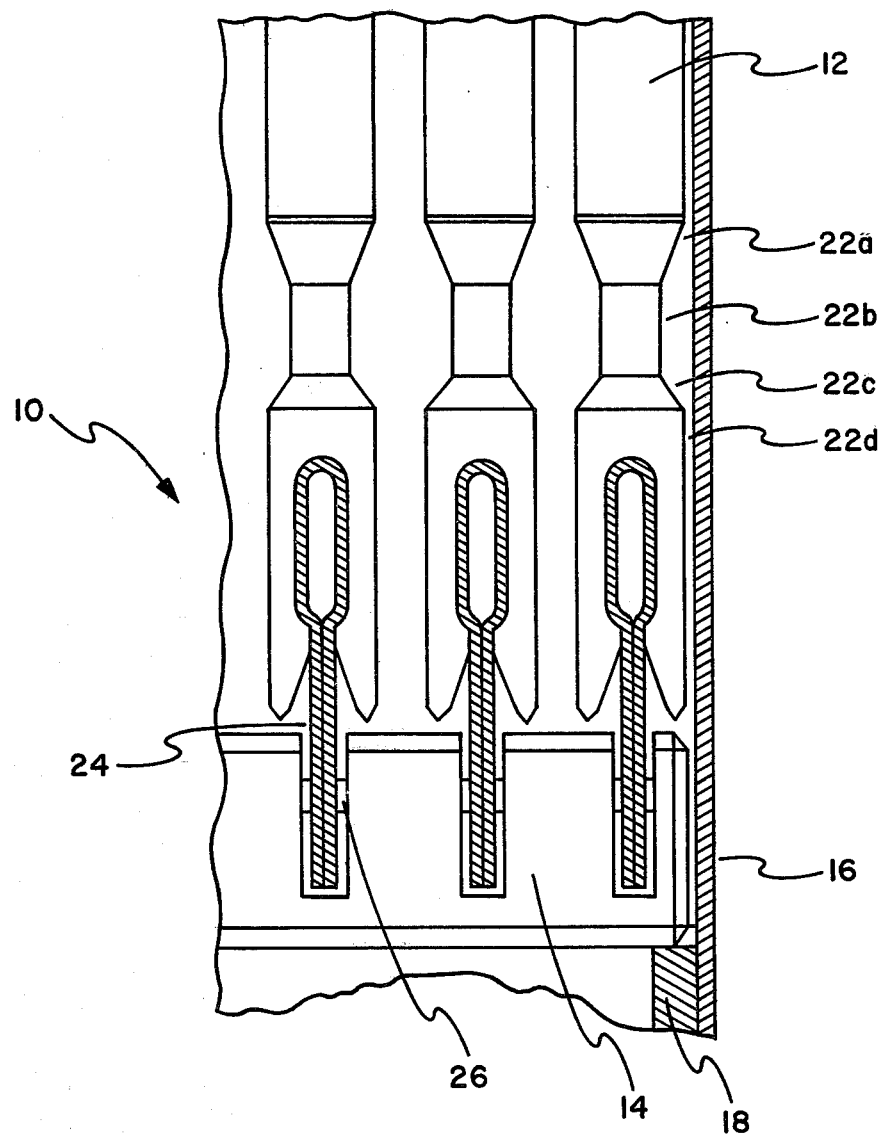
FIG. 1 is a sectional fragmentary view of a fuel assembly showing three nuclear reactor fuel rods attached to a support member utilizing locking caps and locking strips.

In FIG. 1, part of a fuel assembly 10 is shown. A typical nuclear reactor contains many fuel assemblies. Each fuel assembly typically contains over a hundred nuclear reactor fuel rods, which are also called fuel pins. Only three nuclear reactor fuel rods 12 are shown in the fuel assembly 10 in FIG. 1. Preferably the bottom of a fuel rod 12 is attached to a support member 14 of the fuel assembly 10. Only the lower end of the fuel rod 12 is shown in FIG. 1. As FIG. 1 is a sectional view, the fuel assembly duct tube 16 is so indicated. The shield-/inlet nozzle assembly walls 18 form a channel for the coolant to flow upwards through the space between the fuel rods and out the top of the fuel assembly.

The bottom of the fuel rod 12 is fastened to the top part 22a of a locking cap. The middle part 22b of the locking cap joins the top part 22a to a transition section 22c. The lower part 22d forms a socket, and the lower part is connected to the middle part by the transition section 22c. For particular applications, two or more adjoining locking cap parts may be configured of different materials to allow for their relative rotation and attachment requirements. The locking cap socket forming lower part 22d is rigidly attached to a locking strip 24. FIG. 1 depicts a sectional view of the locking strip 24 which preferably is widened to allow for attachment of additional fuel rods in front of, and behind, the fuel rods shown in FIG. 1. A pin bar 26 secures the locking strip 24 to the support member 14.

Figure 2:
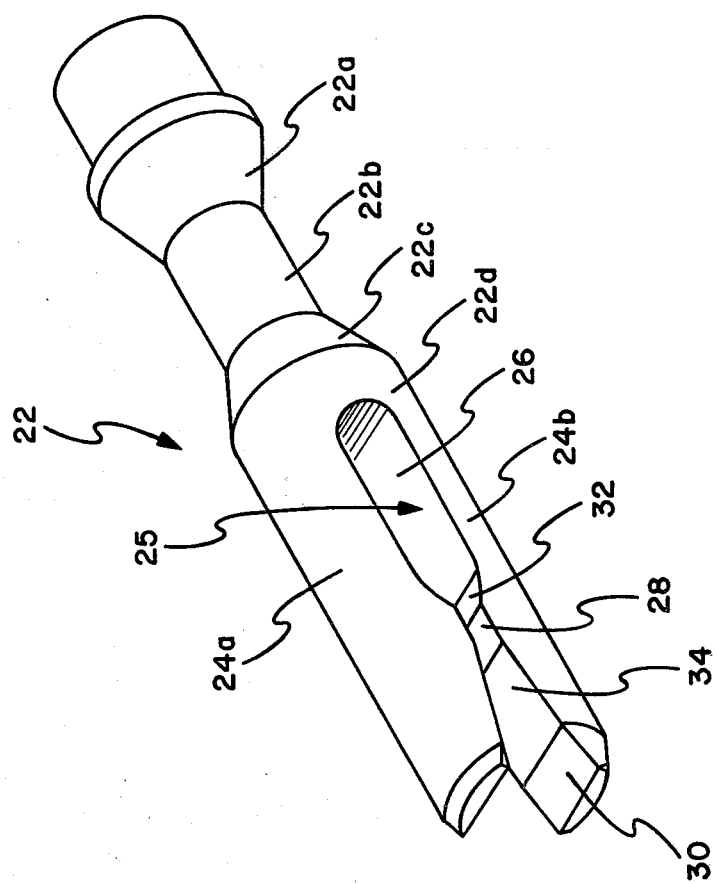
FIG. 2 is a perspective view of a locking cap of FIG. 1.

The locking cap 22 is shown in more detail in FIG. 2. The lower part 22d of the locking cap terminates in opposing fingers 24a and 24b defining a socket 25. Preferably, there are two fingers defining the socket 25. These cantilever fingers can be deflected apart. They are resilient so that they will spring back toward their original configuration when the deflecting force is reduced. The socket 25 has a body portion 26, a throat portion 28, and a mouth portion 30. The socket's body portion 26 narrows to the throat portion 28 along a decoupling-aiding tapered or chamfered section 32. Likewise, the mouth portion 30 narrows to the throat portion 28 along a coupling-aiding tapered or chamfered section 34.

The locking cap is reusable allowing for repeated attachment and removal of the nuclear reactor fuel rod to the support member. Preferably, the locking cap is fastened or secured to the nuclear reactor fuel rod and the locking strip is connected to the support member. However, the locking cap could be secured to the support member and the locking strip fastened to the nuclear reactor fuel rod. Preferably, the socket's body portion 26 has generally flat or planar surfaces which are generally parallel to the longitudinal axis of the socket. This will prevent rotation with a likewise configured locking strip extension. Preferably a plurality of nuclear reactor fuel rods, each having a locking cap, are secured to one widened locking strip, with standard spacer grids or wire wrap used to control positioning. Generally a nuclear reactor has two parallel, spaced-apart support members 14, with each of the reactor's many widened locking strips supported towards each end by one support member 14. The coupling-aiding tapered section 34 is made generally planar to aid in the attachment process. It is preferable that the coupling-aiding tapered section 34 be made to have a more gradual taper than the taper of the decoupling-aiding tapered section 32 such that the decoupling force required for removal would be much greater than the coupling force required for attachment.

Figure 3:
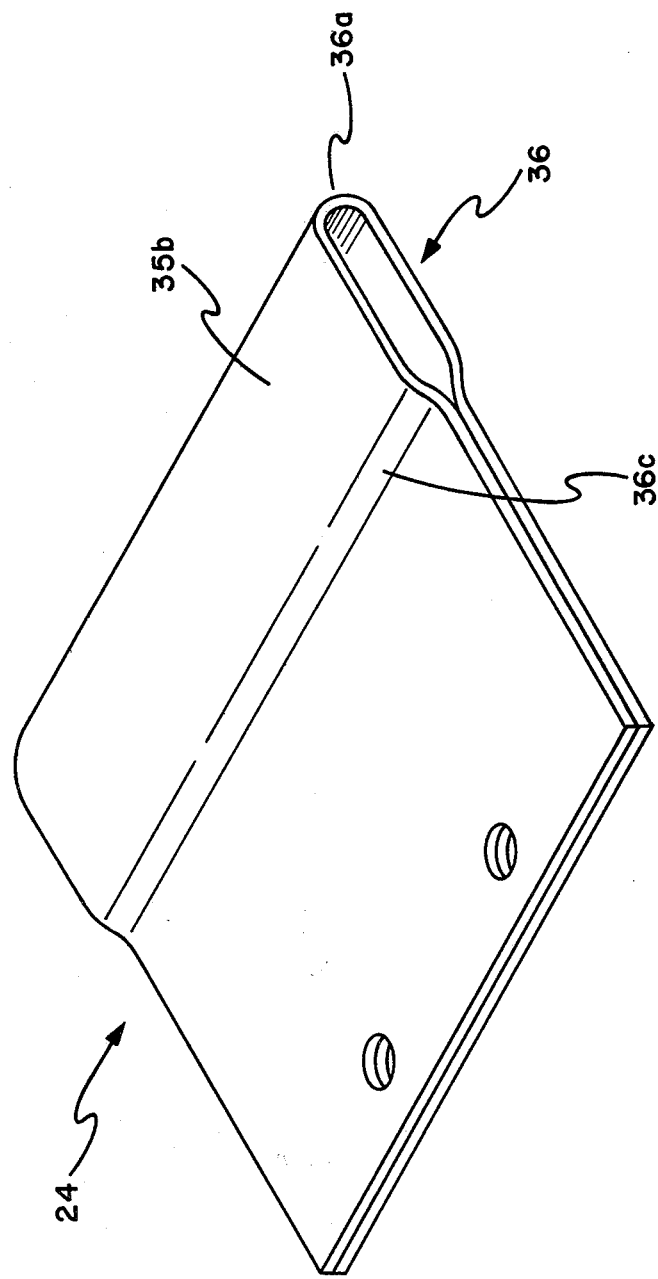
FIG. 3 is a perspective view of a locking strip of FIG. 1.

The locking strip is depicted in FIG. 3. The locking strip 24 has an extension 36. The extension 36 consists of a top section 36a, which preferably has a convex shape to allow for easier attachment, a middle section 36b, having generally planar surfaces which are generally parallel to the longitudinal axis of the socket to help prevent rotation when the extension is attached to the socket, and a bottom section 36c. The extension is configured to always make a rigid connection within the socket's body portion 26. Due to irradiation relaxing effects on prestressted members, it is preferable that a rigid connection be made when the fingers are relaxed (not deflected at all). Preferably the extension is shaped to generally fill the area of the socket's body portion when the extension is attached to the socket.

The locking strip extension's planar middle section 36b abuts the socket's generally planar body portion 26 to prevent rotation.

To attach the nuclear reactor fuel rod to the support member, the fuel rod is lowered to a point just above the support member. The fuel rod is then lowered until the locking cap's coupling-aiding tapered section 34 makes contact with the top section 36a of the locking strip extension. The fuel rod is then pushed onto the locking strip by application of a coupling force sufficient to pry apart or deflect open the locking cap fingers 24a and 24b to widen the socket's throat portion 28 to allow passage of the locking strip's extension 36 into the body portion 26 of the socket. Upon complete insertion, the locking cap fingers spring back towards, and preferably to, their original position so that there is rigid attachment of the fuel rod to the support member.

While the fuel rod is attached to the support member, in the preferred embodiment, relative rotation of the locking cap and the locking strip is prevented by engagement of the planar surfaces of the extension's middle section 36b and the socket's body portion 26. However, it may not be desirable to prevent fuel rod rotation for all applications of the system, such as in certain testing situations, by rotatably mounting the fuel rod to the locking cap or rotatably mounting the locking cap to the locking strip.

The attached nuclear reactor fuel rod is removed from the support member by applying a decoupling force to pull apart the locking cap and locking strip. Upon application of the decoupling force, the bottom portion 36c of the locking strip's extension engages the socket's decoupling-aiding tapered section 32 to push apart or deflect open the locking cap fingers to widen the socket's throat portion and allow removal of the extension from the socket. The locking cap fingers thereupon spring back towards their original configuration.

The locking cap and locking strip are designed for repeated use. Preferably appropriate tapers are chosen as previously discussed to require a much greater force for removal than for attachment.

Figure 4:
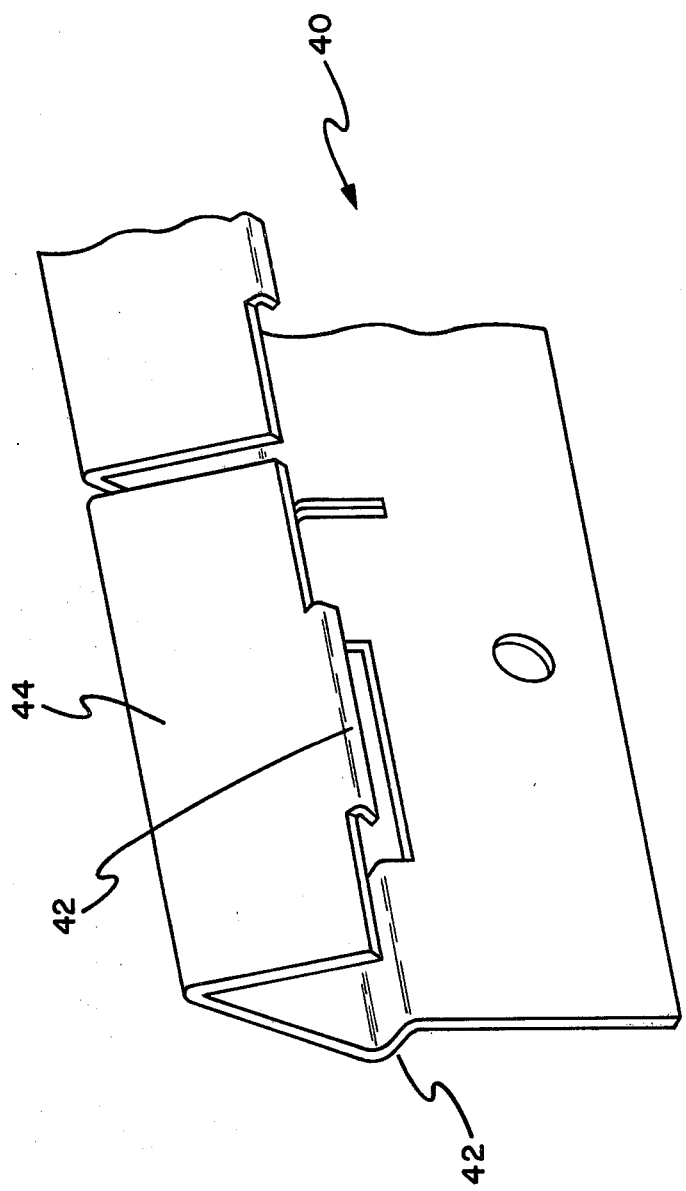
FIG. 4 is a perspective view of an optional locking strip.
Figure 5:
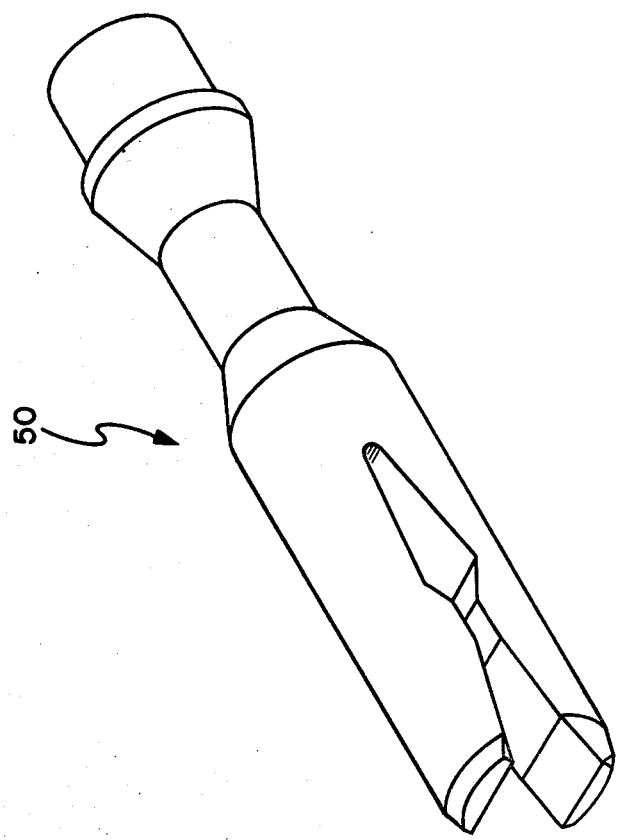
FIG. 5 is a perspective view of an optional locking cap which is used with the optional locking strip of FIG. 4.

An alternate system for removably attaching a nuclear reactor fuel rod to a support member would include an optional locking strip made of materials allowing the locking strip's extension to be compressed in a transverse direction with a resilient return towards the original shape upon reduction of the compressive force. One shape for the optional locking strip, which allows transverse compression, is shown in the optional locking strip 40 of FIG. 4, which includes decoupling-aiding tapered sections 42. Such a system would also have an optional locking cap 50, which matches the optional locking strip 40 to allow for a rigid connection, as shown in FIG. 5. The optional locking cap 50 is made of materials providing for generally rigid fingers instead of resiliently deflectable fingers. Now, during the attachment procedure, instead of the fingers moving apart, the optional locking strip 40 would be transversely compressed to allow insertion of the optional locking strip's extension 44 into the locking cap's socket. Preferably the rigid connection is made when the compressive force is removed and the extension returns to its original shape. Removal of an attached fuel rod from a support member would be accomplished in a similar manner when they are pulled apart. In this option, it is understood that the optional locking cap could be fastened to the nuclear reactor fuel rod and the optional locking strip to the support member, or the optional locking cap could be secured to the support member while the optional locking strip is fastened to the nuclear reactor fuel rod.

In summary, by using a resiliently deflectable socket and/or a transversely compressible extension, both suitably shaped to aid coupling and decoupling and to allow for rigid attachment of the extension to the socket, a nuclear reactor fuel rod can be removably attached to a support member in a reusable system by securing a locking cap having the socket to the nuclear reactor fuel rod (or support member) and securing a locking strip having the extension to the support member (or fuel rod). This provides a reusable, economical and rapid push-pull type attachment and removal system for nuclear reactor fuel rods.

The foregoing description of a preferred embodiment of the invention has been presented for purposes of illustration and description. It is not intended to be exhaustive or to limit the invention in the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A system for removably attaching a nuclear reactor fuel rod to a support member comprising:

a. A reusable locking cap, secured to said nuclear reactor fuel rod, having opposing, resiliently deflectable fingers defining a socket having a body, throat, and mouth portion, said socket also having a narrowing decoupling-aiding tapered section from said body portion to said throat portion and a narrowing coupling-aiding tapered section from said mouth portion to said throat portion; and b. A reusable locking strip, secured to said support member, having an extension which fixedly engages said body portion of said socket, said extension comprising a top section which, upon application of a coupling force, engages said coupling-aiding tapered section to deflect open said fingers to widen said throat portion for receiving said extension into said body portion of said socket, and said extension also comprising a bottom section which, upon application of a decoupling force, engages said decoupling-aiding tapered section to deflect open said fingers without distortion to widen said throat portion for removing said extension from said body portion of said socket.

2. The system of claim 1, wherein said locking strip's extension fixedly engages said body portion of said socket when said fingers are generally relaxed.

3. The system of claim 2, wherein:

(A) Said socket has a longitudinal axis, and said body portion has rotation-preventing generally planar finger surfaces generally parallel to said longitudinal axis; and (B) Said extension has a middle section having generally planar surfaces, generally parallel to said longitudinal axis, which engage, upon application of a torque, said rotation-preventing generally planar finger surfaces when said extension is attached to said socket.

4. The system of claim 3, also including an additional said locking cap secured to an additional said fuel rod, and wherein said locking caps each have two fingers and said locking strip has a widened said extension to also accommodate said additional locking cap.

5. The system of claim 4, wherein said coupling-aiding tapered section has generally planar finger surfaces.

6. The system of claim 5, wherein said top section has a convex area which, upon application of said coupling force, engages said coupling-aiding tapered section.

7. The system of claim 6, wherein said extension generally fills said socket when said extension is attached to said socket.

8. The system of claim 7, wherein said coupling-aiding tapered section has a more gradual taper than that of said decoupling-aiding tapered section, and said decoupling force is greater than said coupling force.

9. A system for removably attaching a nuclear reactor fuel rod to support member, comprising:

a. A reusable locking cap, secured to said support member, having opposing, resiliently deflectable fingers defining a socket having a body, throat, and mouth portion, said socket also having a narrowing decoupling-aiding tapered section from said body portion to said throat portion and a narrowing coupling-aiding tapered section from said mouth portion to said throat portion; and b. A reusable locking strip, secured to said nuclear reactor fuel rod, having an extension which fixedly engages said body portion of said socket, said extension comprising a top section which, upon application of a coupling force, engages said coupling-aiding tapered section to deflect open without distortion said fingers to widen said throat portion for receiving said extension into said body portion of said socket, and said extension also comprising a bottom section which, upon application of a decoupling force, engages said decoupling-aiding tapered section to deflect open said fingers to widen said throat portion for removing said extension from said body portion of said socket.

10. A system for removably attaching a nuclear reactor fuel rod to a support member, comprising:
 a. A reusable locking cap, secured to said nuclear reactor fuel rod, having opposing fingers defining a socket having a body, throat, and mouth portion, said socket also having a narrowing decoupling-aiding tapered section from said body portion to said throat portion and a narrowing coupling-aided tapered section from said mouth portion to said throat portion; and
 b. A reusable locking strip, secured to said support member, having a resiliently transversely compressible extension which fixedly engages said body portion of said socket, said extension, upon application of a coupling force, engaging said coupling-aiding tapered section to transversely compress said extension for receiving said extension through said throat portion into said body portion of said socket, and said extension, upon application of a decoupling force, engaging said decoupling-aiding tapered section to transversely compress said extension for removing said extension from said body portion of said socket without distortion.

11. A system for removably attaching a nuclear reactor fuel rod to a support member, comprising:
 a. A reusable locking cap, secured to said support member, having opposing fingers defining a socket having a body, throat, and mouth portion, said socket also having a narrowing decoupling-aiding tapered section from said body portion to said throat portion and a narrowing coupling-aiding tapered section from said mouth portion to said throat portion; and
 b. A reusable locking strip, secured to said nuclear reactor fuel rod, having a resiliently transversely compressible extension which fixedly engages said body portion of said socket, said extension, upon application of a coupling force, engaging said coupling-aiding tapered section to transversely compress said extension for receiving said extension through said throat portion into said body portion of said socket, and said extension, upon application of a decoupling force, engaging said decoupling-aiding tapered section to transversely compress said extension for removing said extension from said body portion of said socket without distortion.

* * * * *